United States Patent [19]
Sasaki et al.

[11] Patent Number: 5,090,391
[45] Date of Patent: Feb. 25, 1992

[54] CONTROL SYSTEM FOR ENGINE WITH MECHANICAL SUPERCHARGER

[75] Inventors: Junsou Sasaki; Mitsuo Hitomi; Toshio Nishikawa; Hidefumi Fujimoto, all of Hiroshima, Japan

[73] Assignee: Mazda Motor Corporation, Hiroshima, Japan

[21] Appl. No.: 503,677

[22] Filed: Apr. 3, 1990

[30] Foreign Application Priority Data

Apr. 5, 1989 [JP] Japan .................................. 1-86188

[51] Int. Cl.⁵ ............................................ F02B 33/00
[52] U.S. Cl. ............................................... 123/559.3
[58] Field of Search ............................. 123/559.3, 563

[56] References Cited
U.S. PATENT DOCUMENTS

| | | | |
|---|---|---|---|
| 4,485,793 | 12/1984 | Oguma | 123/559 |
| 4,656,992 | 4/1987 | Oonaka et al. | 123/559.3 |
| 5,589,396 | 5/1986 | Tokushima et al. | 123/559 |

FOREIGN PATENT DOCUMENTS

| | | |
|---|---|---|
| 3636982 | 5/1987 | Fed. Rep. of Germany . |
| 2535787 | 10/1983 | France . |
| 59-015626 | 1/1984 | Japan . |
| 60-240838 | 11/1985 | Japan . |
| 61-19932 | 1/1986 | Japan . |
| 63-021325 | 1/1988 | Japan . |
| 63-295826 | 12/1988 | Japan . |

Primary Examiner—Richard A. Bertsch
Assistant Examiner—Charles G. Freay
Attorney, Agent, or Firm—Sixbey, Friedman, Leedom and Ferguson

[57] ABSTRACT

A mechanical supercharger is operatively connected to the engine output shaft when the engine speed is not lower than a predetermined engine speed and disconnected from the engine output shaft when the engine speed is lower than the predetermined engine speed. The engine load is detected and the predetermined engine speed is set lower as the engine load becomes lighter.

12 Claims, 3 Drawing Sheets

5,090,391

CONTROL SYSTEM FOR ENGINE WITH MECHANICAL SUPERCHARGER

BACKGROUND OF THE INVENTION

1. Field of the Invention

This invention relates to a control system for an engine provided with a mechanical supercharger which is driven by the engine output power.

2. Description of the Prior Art

There has been known an engine with a mechanical supercharger which is driven by the output power of the engine and is made inoperative by means of an electromagnetic clutch or the like when the engine is started or the vehicle is backed. See Japanese Unexamined Patent Publication Nos. 61(1986)-19932 and 60(1985)-240838, and the like.

Further it has been known to make the mechanical supercharger inoperative and to feed intake air through a bypass passage which bypasses the mechanical supercharger in a low engine speed range lower than a predetermined value in order to reduce the driving loss and improve the fuel economy since the power increase requirement is relatively low when the engine speed is low and the engine load is light.

On the other hand, when the mechanical supercharger begins to be driven in a high engine speed range, an immense engaging shock is generated when the mechanical supercharger is operatively connected to the engine output shaft, which adversely affect the reliability of the clutches, the mechanical supercharger the driving belt and the like. Accordingly, it is preferred that the mechanical supercharger begins to be driven before the engine speed increases to the high engine speed range.

As the mechanical superchargers, there have been known various types such as a root blower type, a screw type and the like.

When such a mechanical supercharger is operatively connected to or disconnected from the engine output shaft at a predetermined engine speed, torque shock is generated due to increase and reduction of load on the engine, and it seems that the lighter the engine load is, the larger the torque shock is.

In FIG. 5, curve A shows the relation between the engine load and the torque which engine produces when the mechanical supercharger engages while curve B shows the same when the mechanical supercharger disengages. The curves A and B cross at a predetermined engine load, and in the engine load range lighter than the predetermined value, the engine produces higher torque when the supercharger do not engages than when the supercharger engages. As can be understood from the comparison of the curves A and B, as the engine load at which the mechanical supercharger engages and begins to operate becomes lighter, the reduction of the torque becomes larger in the engine load range lighter than the predetermined value.

Since the engaging shock is immense when the mechanical supercharger engages at a high engine speed as described above, and the driver experience more shock for a given torque fluctuation as the engine load reduces, it has been a great demand for suppression of the torque shock which is generated when the mechanical supercharger begins to operate.

SUMMARY OF THE INVENTION

In view of the foregoing observations and description, the primary object of the present invention is to provide a control system for an engine provided with a mechanical supercharger in which the torque shock which is generated in response to engagement and disengagement of the mechanical supercharger can be suppressed especially in the light engine load range.

In accordance with the present invention, the mechanical supercharger is operatively connected to the engine output shaft when the engine speed is not lower than a predetermined engine speed and disconnected from the engine output shaft when the engine speed is lower than the predetermined engine speed. The engine load is detected and the predetermined engine speed is set lower as the engine load becomes lighter.

With this arrangement, the torque shock which is generated in response to engagement and disengagement of the mechanical supercharger can be minimized and at the same time, the mechanical supercharger can be made inoperative, thereby improving the fuel economy, in the low engine speed range.

DESCRIPTION OF THE PREFERRED EMBODIMENT

Figure 1:
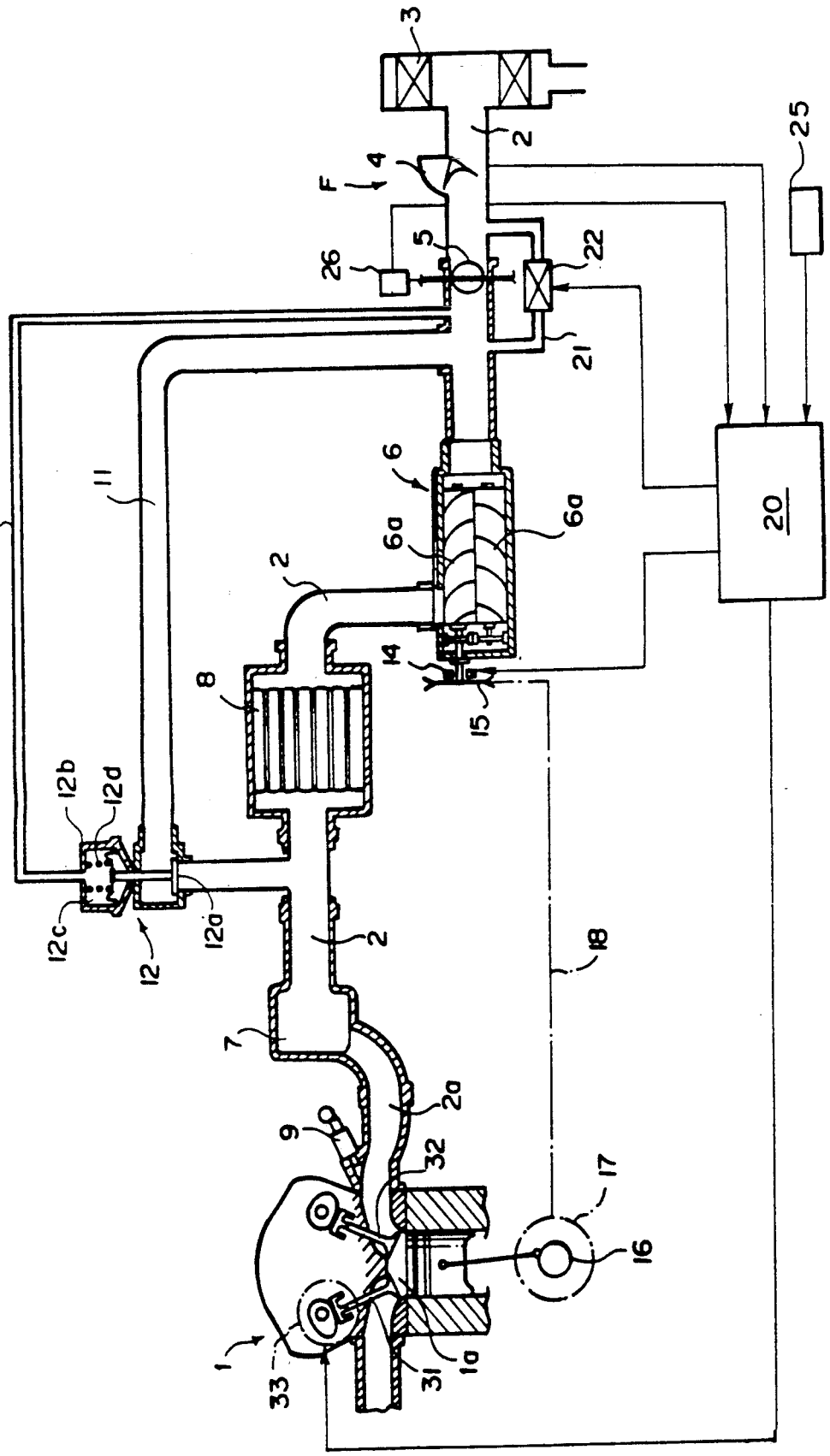
FIG. 1 is a schematic view showing a control system for an engine with a mechanical supercharger in accordance with an embodiment of the present invention.

In FIG. 1, an air cleaner 3, an airflow meter 4 and a throttle valve 5 is provided in an intake passage 2 for introducing air into cylinders 1a of an engine. A mechanical supercharger 6 is provided downstream of the throttle valve 5. In this embodiment, the mechanical supercharger is a screw type (Lysholm type) of internal compression supercharger in which a pair of screw-like rotors 6a are rotated in opposite directions in mesh with each other and air in the space defined by the inner surface of the casing and the recesses of the rotors 6a is discharged under pressure.

An intercooler 8 is provided in the intake passage 2 downstream of the mechanical supercharger 6, and a surge tank 7 is formed in the intake passage 2 downstream of the intercooler 8. The intake passage 2 is divided at a portion downstream of the surge tank 7 into discrete intake passages 2a which lead to the respective cylinders 1a. An fuel injector 9 is disposed in each discrete passage 2a. A supercharger bypass passage 11 is connected to the intake passage 2 between the throttle valve 5 and the mechanical supercharger 6 at one end and between the intercooler 8 and the surge tank 7 at the other end. The supercharger bypass passage 11 is provided with a supercharger bypass valve 12 which comprises a valve body 12a which closes and opens the supercharger bypass passage 11 and a diaphragm actuator 12b which moves up and down the valve body 12a, thereby opening and closing the supercharger bypass passage 11. The diaphragm actuator 12b has a pressure chamber 12c into which the intake pressure (negative) downstream of the throttle valve 5 is introduced through a pressure passage 13. When the intake pressure exceeds a preset value, the valve 12a is lifted by an amount corresponding to the value of the intake pressure overcoming the force of a spring 12d. That is, the supercharger bypass passage 11 is opened by an amount corresponding to the value of the intake pressure.

The mechanical supercharger 6 is driven by the engine output power which is transmitted thereto from the engine output shaft 16 by way of a pulley 17 and a pulley 15. The pulley 15 is provided with an electromagnetic clutch 14. The electromagnetic clutch 14 operatively connects and disconnects the mechanical supercharger 6 to and from the engine 1 under the control of a driving signal (an on-off signal) which is output from a controller 20.

A throttle bypass passage 21 connects parts of the intake passage 2 upstream and downstream of the throttle valve 5, and is provided with a throttle bypass valve 22 which controls flow of air therethrough. The controller 20 outputs a control signal to the throttle bypass valve 22 which controls the valve 22 and corrects the engine output power in synchronization with engagement and disengagement of the electromagnetic clutch 14. The throttle bypass valve 22 is also used for controlling the idling engine speed, and when the engine idles, the controller 20 outputs an idling control signal to the valve 22.

A valve timing changing system 33 changes the opening and closing timing of exhaust valve 31 for each cylinder 1a to change the valve overlap, that is the time that the exhaust valve 31 and an intake valve 32 are both open. The controller 20 outputs a control signal to the valve timing changing system 33 according to the operating condition of the engine 1 and causes the valve timing changing system 33 to extend the valve overlap in the operating condition range including the operating condition range in which the electromagnetic clutch 14 engages.

The controller 20 receives an intake air amount signal from the airflow sensor 4 (as the engine load detecting means F), an engine speed signal from an engine speed sensor 25 which detects the engine speed, and an throttle opening signal from a throttle sensor 26 which detects the opening of the throttle valve 5.

The controller 20 causes the electromagnetic clutch 14 to engage or disengage according to the engine load (throttle opening) and the engine speed and opens and closes the throttle bypass valve 22 in synchronization with the engagement and disengagement of the electromagnetic clutch 14.

Figure 3:
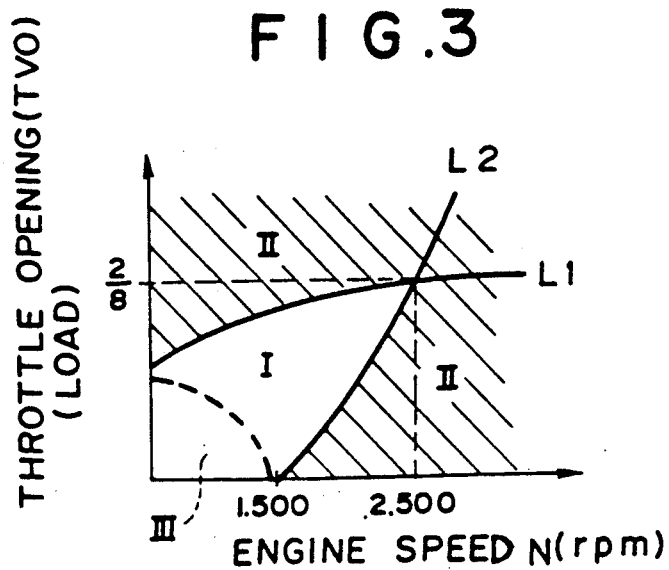
FIG. 3 is a view for illustrating the operating condition ranges.

When the operating condition of the engine on the basis of the engine load and the engine speed is in range I or III in FIG. 3 in which the throttle opening TVO (the engine load) is below line L1 and the engine speed is below line L2 (or in other words to the left of L2 in FIG. 3), the electromagnetic clutch 14 is caused to disengage and the mechanical supercharger 6 is operatively disconnected from the engine output shaft, and when the operating condition of the engine is in the other range designated by II, the electromagnetic clutch 14 is caused to engage and the mechanical supercharger 6 is operatively connected to the engine output shaft.

The line L2 is inclined so that the electromagnetic clutch 14 engages at a lower engine speed when the engine load is lower and the torque shock in the light engine load range is suppressed. The reason the line L2 is curved is because the engine load is represented by the throttle opening, and when the engine load is represented by a boost signal or charging amount (Q/N), the line L1 becomes a straight line.

Figure 4:
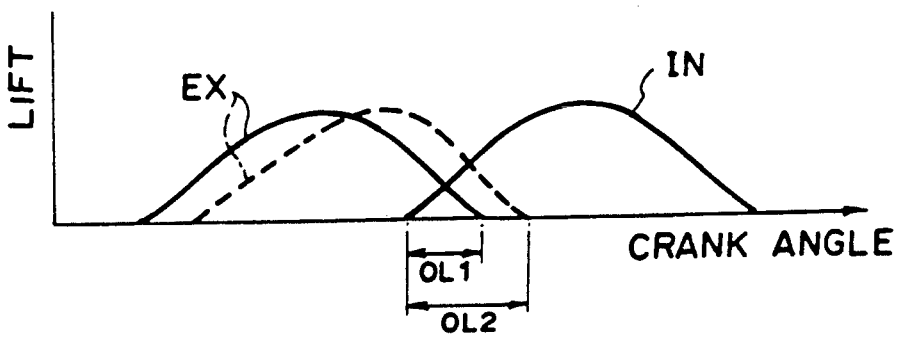
FIG. 4 is a view for illustrating the change of the valve overlap.
Figure 5:
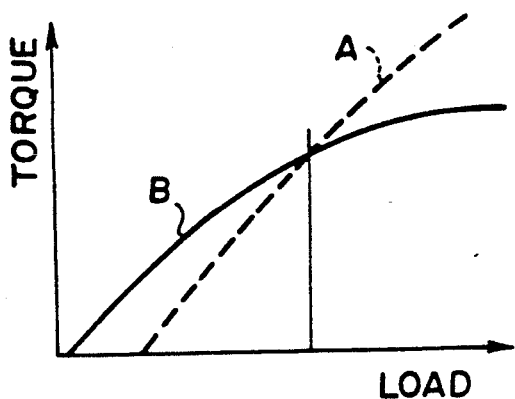
FIG. 5 is a view showing the relations between the engine load and the torque which engine produces when the mechanical supercharger engages and between the engine load and the torque which engine produces when the mechanical supercharger disengages.

In the light load low engine speed range III which is included in the range I, the controller 20 causes the valve timing changing system 33 to get the exhaust valve 31 close earlier, thereby shortening the valve overlap. In the other ranges, the valve overlap is extended. In FIG. 4, the exhaust valve in the range III is shown by the solid line. As can be seen in FIG. 4, the exhaust valve is closed earlier in the range III than in the other ranges and the valve overlap OL1 when the operating condition is in the range III is shorter than the valve overlap OL2 when the operating condition is in the other ranges.

In order to reduce residual exhaust gas in the cylinders 1a and lower the temperature in the cylinders 1a, which is preferable in view of suppression of the engine knock, the valve overlap is extended in the heavy load high engine speed range II where the mechanical supercharger 6 is operated.

On the other hand, if the valve overlap is long in the light load low engine speed range III, the exhaust can be blown back into the intake passage 2 when the engine speed decreases and the exhaust pressure becomes higher than the intake pressure, and the combustion in the cylinders 1a is adversely affected. Accordingly, the valve overlap is shortened in the range III.

In the range I except the range III, the combustion stability can be obtained even if the valve overlap is long. Accordingly, in order to increase the amount of residual exhaust gas in the cylinders 1a and increase the throttle opening which is required to introduce a given amount of intake air, thereby reducing the pumping loss and improving the fuel economy, the valve overlap is extended in the range I except the range III. If the range I and the range III coincide with each other, the valve overlap changes simultaneously with switching between engagement and disengagement of the electromagnetic clutch 14, and the torque shock can be enhanced. However, the range I and III may basically coincide with each other.

Figure 2:
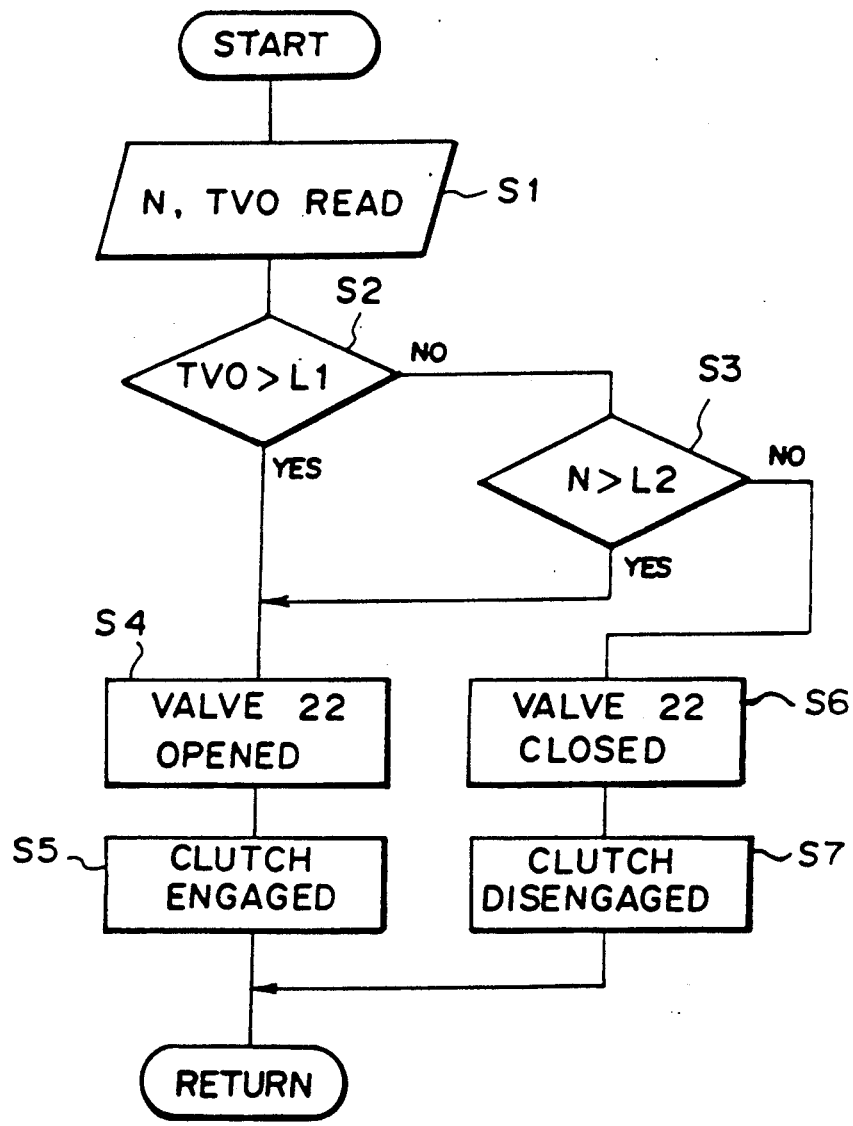
FIG. 2 is a flow chart for illustrating the operation of the control system.

The operation of the controller 20 will be described with reference to the flow chart shown in FIG. 2. The flow chart shown in FIG. 2 shows only the operation of the controller 20 related to the electromagnetic clutch 14 and the throttle bypass valve 22. The controller 20 first reads the engine speed N and the throttle opening TVO in step S1. Then the controller 20 determines in step S2 whether the engine load is heavy based on the map shown in FIG. 3. That is, the controller 20 determines whether the value of the throttle opening TVO is in the range above the line L1. When it is determined in step S2 that the engine load is light, the controller 20 determines in step S3 whether the engine speed N is high, i.e., whether the engine speed N is in the range on the right side of the line L2.

When it is determined in step S3 that the engine speed is low, that is, when the operating condition is in the range I, the controller 20 closes the throttle bypass valve 22 in step S6 and disengages the electromagnetic clutch 14 in step S7. That is, the mechanical supercharger 6 is not driven. In this state, the supercharger bypass valve 12 opens under the force of the negative intake pressure introduced into the pressure chamber 12c and intake air is introduced in the cylinders 1a through the supercharger bypass passage 11.

When it is determined in step S2 that the engine load is heavy or when it is determined in step S3 that the engine speed N is high, that is, when it is determined that the operating condition is in the range II, the controller 20 wide opens the throttle bypass valve 22 in step S4 to increase the engine output power and engages the electromagnetic clutch 14 to drive the mechanical supercharger 6 in step S5.

While the mechanical supercharger 6 operates, the supercharger bypass valve 12 is gradually closed since the pressure introduced into the pressure chamber 12c increases, which contributes to increase of the supercharging pressure.

When the answers for steps S2 and S3 turn to NO while the electromagnetic clutch 14 engages and the mechanical supercharger 6 is operating, the controller 20 first full closes the throttle bypass valve 22 (step S6) to reduce the engine output power, and then disengages the electromagnetic clutch 14 (step S7). In this manner, the torque shock is suppressed.

In the embodiment described above, the line L2 which is used for determining the switching between engagement and disengagement of the electromagnetic clutch 14 is set so that the electromagnetic clutch 14 engages or disengages at a lower engine speed as the engine load reduces. Accordingly, the torque shock which is generated when the electromagnetic clutch 14 engages can be effectively suppressed especially in the light engine load range in which the torque shock is experienced to be more immense.

When the mechanical supercharger 6 is an internal compression type of supercharger as in the embodiment described above, the driving load is particularly heavy and the torque shock is very immense, and accordingly, the present invention is particularly useful to such a mechanical supercharger.

What is claimed is:

1. A control system for an engine with a mechanical supercharger in which the mechanical supercharger is operatively connected to an engine output shaft and is driven when the engine speed is not lower than a predetermined engine speed, said control system comprising an engine load detecting means which detects load on the engine and a control means which receives the signal from a engine load detecting means and sets the predetermined engine speed lower as the engine load becomes lighter.

2. A control system as defined in claim 1 in which said mechanical supercharger is connected to the engine output shaft by way of a clutch.

3. A control system as defined in claim 2 in which said engine load detecting means detects the engine load through the opening of a throttle valve.

4. A control system as defined in claim 3 further comprising a means for operatively connecting the mechanical supercharger to the engine output shaft when the opening of the throttle valve is not smaller than a predetermined value.

5. A control system as defined in claim 4 in which said predetermined value is determined according to the engine speed.

6. A control system as defined in claim 2 further comprising an engine output correcting means which increases or reduces the engine output in synchronization with the switching of engagement and disengagement of said clutch.

7. A control system as defined in claim 6 in which said engine output correcting means increases the engine output when the clutch engages and reduces the same when the clutch disengages.

8. A control system as defined in claim 6 in which said engine output correcting means is a valve which opens and closes a bypass passage which bypasses the throttle valve of the engine.

9. An engine characterized by having
a mechanical supercharger which is provided in an intake passage of the engine and is driven by the engine output shaft,
an electromagnetic clutch which engages and disengages to operatively connect and disconnect the mechanical supercharger to and from an engine output shaft,
an engine speed sensor which detects the engine speed,
an engine load sensor which detects the load on the engine, and
a control means which receives signals from the engine speed sensor and the engine load sensor and outputs a control signal to the electromagnetic clutch to cause the electromagnetic clutch to engage or disengage according to the operating condition of the engine determined based on the engine speed and the engine load, the control means causing the electromagnetic clutch to disengage when the operating condition is in a range where the engine speed is lower than a predetermined engine speed and the engine load is lighter than a predetermined value, the predetermined engine speed being changed according to the engine load.

10. An engine as defined in claim 9 in which said predetermined engine speed is set lower as the engine load becomes lighter.

11. An engine as defined in claim 10 which further comprises an engine output correcting means which increases or reduces the engine output in synchronization with the switching of engagement and disengagement of said clutch under the control of said control means.

12. An engine as defined in claim 11 in which said engine output correcting means is a valve which opens and closes a bypass passage which bypasses the throttle valve of the engine.

* * * * *